(12) United States Patent
Yang

(10) Patent No.: US 7,916,594 B2
(45) Date of Patent: Mar. 29, 2011

(54) DATA PROCESSING APPARATUS AND METHOD FOR REPRODUCING DATA OF AN OPTICAL RECORDING MEDIUM

(75) Inventor: Jenn-Ning Yang, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 498 days.

(21) Appl. No.: 12/141,093

(22) Filed: Jun. 18, 2008

(65) Prior Publication Data

US 2009/0316548 A1   Dec. 24, 2009

(51) Int. Cl.
*G11B 20/18* (2006.01)

(52) U.S. Cl. ............... 369/53.16; 369/53.31; 369/47.14

(58) Field of Classification Search .................. None
See application file for complete search history.

(56) References Cited

U.S. PATENT DOCUMENTS

2003/0223328 A1*   12/2003   Nadershashi et al. ..... 369/47.14
* cited by examiner

*Primary Examiner* — Thang V Tran
*Assistant Examiner* — Brian Butcher
(74) *Attorney, Agent, or Firm* — Winston Hsu; Scott Margo

(57) ABSTRACT

A data processing apparatus utilized for reproducing data from an optical storage medium has individual checking modules for separately controlling a data outputting operation of a data buffering unit according to the data buffered in the data buffering unit and a primary defect list, and for controlling a decoding operation of a decoding unit according to the data stored in a memory unit and a secondary defect list. The flow path of the related data processing method is therefore simplified because all the checking operations of the defective status of the data read from the optical storage medium are accomplished by the checking modules.

10 Claims, 4 Drawing Sheets

| Entry Type | Reserved | Defective sector number |
|---|---|---| b31 b30 b29　　　　　b24 b23　　　　　　　　　　　　　　　b0

FIG. 1A

| b63 | b62 | b61 b56 | b55 b32 | b31 b24 | b23 b0 |
|---|---|---|---|---|---|
| Reserved | SLR | Reserved | Sector number of the first sector in the defective block | Reserved | Sector number of the first sector in the replacement block |

FIG. 1B

DATA PROCESSING APPARATUS AND METHOD FOR REPRODUCING DATA OF AN OPTICAL RECORDING MEDIUM

BACKGROUND

The invention relates to a data processing apparatus for an optical storage medium and a data processing method thereof, and more particularly, to a data processing apparatus and method utilized for reproducing data from an optical storage medium by utilizing individual checking modules.

An optical storage medium such as a DVD disc may suffer from improper formatting processes and improper utilization processes, and therefore becomes a bad disk with fail tracks. The physical identifications (IDs) of the defective sectors resulting from improper formatting processes are recorded in a primary defect list (PDL). FIG. 1A shows an entry in the primary defect list.

In addition to the primary defect list, a secondary defect list (SDL) is set up to record the physical IDs of the first sectors of defective error correction code (ECC) blocks (one ECC block includes 16 sectors) that resulted from improper utilization processes. For example, scratches or dust on the optical click will make some tracks unable to be utilized for recording data correctly, and these defects are recorded in the secondary defect list. An entry of the secondary defect list is shown in FIG. 1B. The physical IDs of the first sectors of the spare blocks which replace the defective ECC blocks are also recorded in the secondary defect list to help a data processing apparatus reproduce data from the optical storage medium properly. Since the data structures of the primary defect list and secondary defect list are well known to those skilled in this art, further description is omitted here for the sake of brevity.

A conventional data reproducing device, such as an optical disc drive, is developed for accessing information recorded on an optical disc. When receiving a read command from a host computer, the data reproducing device reads the optical disc and loads the primary defect list and the secondary defect list from the optical disc to a memory. When the digital data stored in the optical disc are transmitted into the data reproducing device, the data reproducing device counts IDs per sector of the digital data, and compares the counting result with the primary defect list and the secondary defect list stored in the memory to determine if the ID of the sector of the digital data is listed in the primary defect list or the secondary defect list. The determining results corresponding to the primary defect list helps the data reproducing device determine if the content of the sector is stored or not. The determined results corresponding to the secondary defect list are stored in the memory, and will be referenced in the following decoding process.

The decoding process is launched when the amount of stored data reaches that of an ECC block. Therefore, the determining results stored in the memory are read to check if the ECC block is a defective ECC block every time the amount of stored data reaches that of an ECC block. Since the storing and the decoding of the data are not performed in the same time, the amount of determined results stored in the memory is large, and the above-mentioned data reproducing procedure consumes a lot of time in reading the determined results stored in the memory. Moreover, the flow path of the data reproducing procedure is complex since the data reproducing device needs not to perform the decoding process but also to make the decision of whether the ECC block is allowed to be decoded or not according to the determined results.

SUMMARY

One objective of the invention is therefore to provide a data processing apparatus for an optical storage medium and a method which utilizes individual checking modules to separately check the primary defect list and the secondary defect list, thereby simplifying the data reproducing process. A first checking module of the data processing apparatus is configures to control a data outputting operation of a data buffering unit according to the data buffered in the data buffering unit and the primary defect list, and a second checking module of the data processing apparatus is configures to control a decoding operation of a decoding unit according to the data stored in a memory unit and the secondary defect list.

According to an exemplary embodiment of the present invention, a data processing apparatus for an optical storage medium comprises a memory unit, for storing a primary defect list and a secondary defect list loaded from the optical storage medium, wherein the primary defect list and the secondary defect list indicate defect identifications (IDs) in the optical storage medium; a data buffering unit, coupled to the memory unit, for buffering data read from the optical storage medium and outputting the data to the memory unit; a first checking module, coupled to the memory unit and the data buffering unit, for controlling a data outputting operation of the data buffering unit according to the data buffered in the data buffering unit and the primary defect list; a decoding unit, coupled to the memory unit, for decoding data read from the memory unit; and a second checking module, coupled to the memory unit and the decoding unit, for controlling a decoding operation of the decoding unit according to the data stored in the memory unit and the secondary defect list.

According to an exemplary embodiment of the present invention, a data processing method for an optical storage medium comprises: storing a primary defect list and a secondary defect list loaded from an optical storage medium, wherein the primary defect list and the secondary defect list indicate defect identifications (IDs) in the optical storage medium; buffering data read from the optical storage medium into a data buffering unit; controlling a data outputting operation from the data buffering unit to a memory unit by a first checking module according to the data buffered in the data buffering unit and the primary defect list; decoding data read from the memory unit; and controlling a decoding operation by a second checking module according to the data stored in the memory unit and the secondary defect list.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1A and FIG. 1B show an entry of a primary defect list and an entry of a secondary defect list, respectively.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
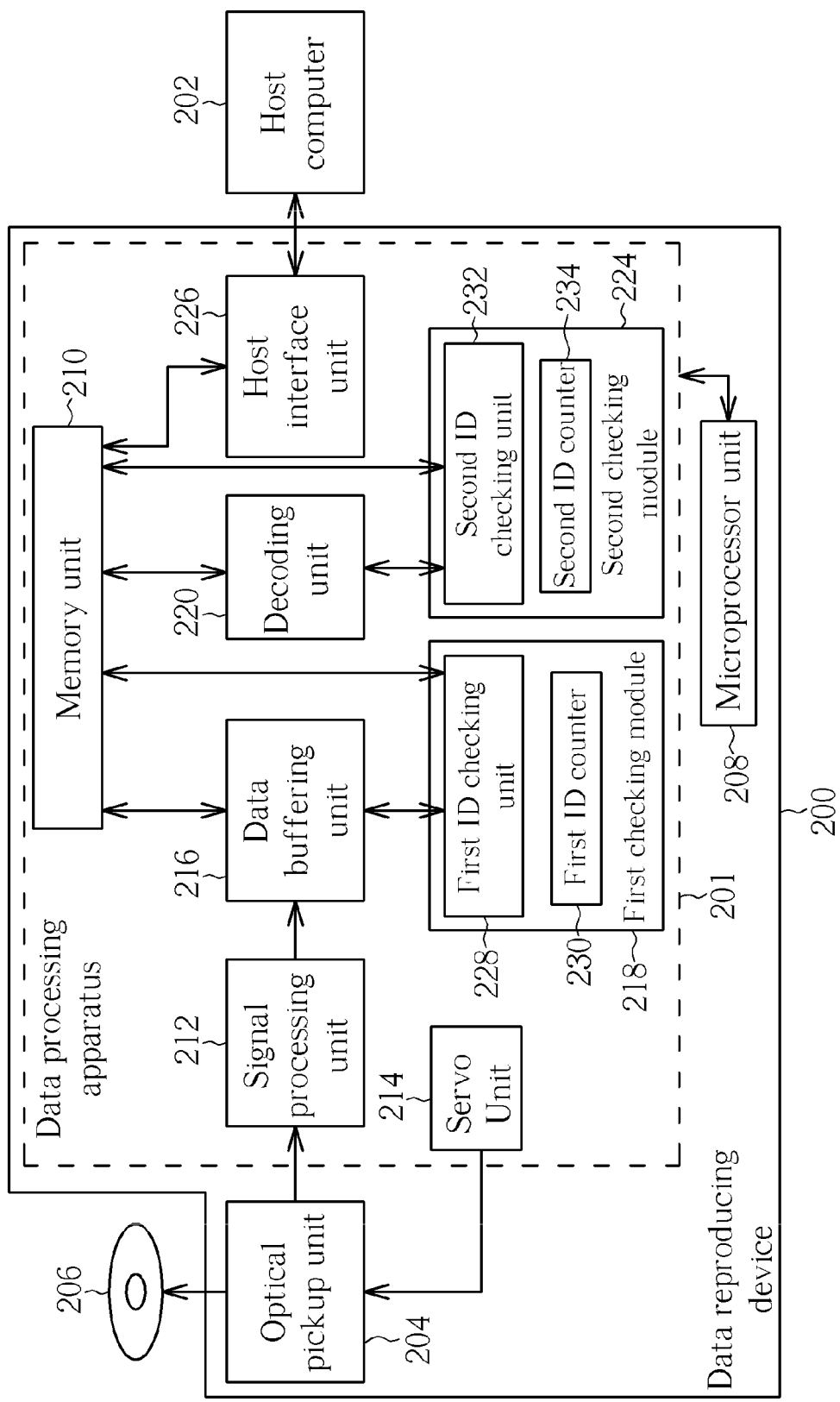
FIG. 2 is a block diagram of a data reproducing device according to an exemplary embodiment of the present invention.

According to an exemplary embodiment of the present invention, FIG. 2 illustrates a block diagram of a data reproducing device 200 according to an exemplary embodiment of the present invention. The data reproducing device 200 includes a data processing apparatus 201, an optical pickup unit 204, and a microprocessor 208. The data processing apparatus 201 is controlled by a host computer 202 and the microprocessor unit 208. The optical pickup unit 204 is for accessing an optical storage medium 206. In this embodiment, the optical storage medium 206 is a DVD-RAM disc. However, this is not meant to be a limitation of the present invention, and a skilled person can readily realize that the disclosed data processing scheme can be applied to other optical storage media.

As shown in FIG. 2, the data processing apparatus 201 includes a memory unit 210, a signal processing unit 212, a servo unit 214, a data buffering unit 216 coupled to the memory unit 210, a first checking module 218 comprising a first ID counter 230 and a first ID checking unit 228 coupled to the memory unit 210 and the data buffering unit 216, a decoding unit 220 coupled to the memory unit 210, a second checking module 224 comprising a second ID counter 234 and a second ID checking unit 232 coupled to the memory unit 210 and the decoding unit 220, and a host interface unit 226.

After receiving a read command from the host computer 202 via the host interface unit 226, the servo unit 214 controls the optical pickup unit 204 according to the read command to read the optical storage medium 206. The optical pickup unit 204 reads information recorded on the optical storage medium 206 by emitting a laser beam onto a recording layer of the optical storage medium 206 and then reading optical signals reflected therefrom. Then the signal processing unit 212 converts the optical signals into digital data composed of zeros and ones ('0' and '1'), and transmits the digital data to the data buffering unit 216.

It is noted that the primary defect list and the secondary defect list are loaded from the optical storage medium 206 to the memory unit 210. In this embodiment, the optical storage medium 206 is a DVD-RAM disc, and therefore the digital data read from it is composed of a plurality of sectors.

Next, the first checking module 218 controls a data outputting operation from the data buffering unit 216 to the memory unit 210 according to the data (i.e. sectors) buffered in the data buffering unit 216 and the primary defect list. In detail, the first ID counter 230 counts IDs of the data read from the optical storage medium 206 per sector to generate a counting result; for example, the counting result is increased by one each time when an ID of a new sector buffered in the data buffering unit 216 is counted. Then, the first ID checking unit 228 checks if the ID of the data buffered in the data buffering unit 216 is in the primary defect list according to the counting result to generate a detection result.

The first checking module 218 then sends a control signal to the data buffering unit 216 for notifying not to output the data buffered in the data buffering unit 216 to the memory unit 210 if the ID of the data is in the primary defect list. However, if the ID of the data is not in the primary defect list, the first ID checking unit 228 will do nothing to the data buffering unit 216, and the data buffering unit 216 will output the buffered data to the memory unit 210 normally. Therefore the digital data stored in the memory unit 210 will not contain any unknown data of the defective sectors resulting from improper formatting processes, and could be ideally the same as the coded digital data written in the optical storage medium 206.

The data buffering unit 216 will send a complete signal to the first ID counter 230 when the data buffered in the data buffering unit 216 has been processed. In response to the complete signal, the counting result of the first ID counter 230 will be increased by one in this embodiment, and the first ID checking unit 228 will check the data buffered in the data buffering unit 216 again at this time. By utilizing the first checking module 218, the data inputted into the memory unit 210 can be checked instantaneously, and the operation of the data buffering unit 216 is simple by operating according to the control signal sent by the first checking unit 218.

In short, with the help of the first checking module 218, the incoming data is checked sector by sector, and the sectors without IDs listed on the primary defect list are allowed to be delivered to the memory unit 210. Additionally, the entries in the primary defect list are stored according to an increasing order of IDs of the defective sectors. Therefore, utilizing the first ID counter 230 to count IDs of the data read from the optical storage medium 206 per sector can produce an increasing counting result. In this way, the PDL entries that store ID numbers less than the current counting result are not read again for comparison since they have been checked. In other words, the PDL entry storing an ID number equal to or greater than the counting result is retrieved for comparison. Therefore, the defective sector identification process is simplified.

When the amount of data stored in the memory unit 210 reaches a predetermined value (i.e. a data amount of an ECC block), the microprocessor unit 208 launches a decoding process of the decoding unit 220 to decode the data read from the memory unit 210. The second checking unit 224 then controls the decoding operation of the decoding unit 220 according to the data stored in the memory unit 210 and the secondary defect list. The second ID counter 234 counts IDs of the data read from the memory unit 210 per block to generate a counting result; for example, if each ECC block includes 16 sectors, the counting result is increased by 16 each time when an ID of the first sector in a new ECC block to be decoded is counted. The second ID checking unit 232 then checks if the ID of the first sector of the ECC block read from the memory unit 210 is in the secondary defect list, and checks the replacement status of the ECC block according to the counting result.

In other words, the second checking unit 224 is configured to check the data buffered in the memory unit 210 in a block by block fashion, where the ID of the first sector in the ECC block to be decoded is compared to the secondary defect list. If the ID of the first sector of the data is not in the secondary defect list, the second ID checking module 232 will do nothing to the decoding unit 220, and the decoding unit 220 will decode the data normally. The decoding result will be transmitted to the host computer 202 via the host interface unit 226.

However, if the ID of the first sector of the data is in the secondary defect list and the "Status of Linear Replacement (SLR)" of the data recorded in the secondary defect list is '1', which means the data has no spare block stored in the spare area of the optical storage medium 206, the second ID checking module 232 will send a non-replacement signal to the decoding unit 220 in order to notify the decoding unit 220 to decode the data.

In the situation of decoding error occurs during the decoding process, the decoding unit 220 is configured not to issue a decoding error notification. In other words, the microprocessor unit 208 will not receive the decoding error notification. Otherwise, if the ID of the first sector of the data is in the secondary defect list and the SLR of the data is '0', which means it has a spare block stored in the spare area of the optical storage medium 206, the second ID checking module 232 will send a replacement signal to the decoding unit 220 in order to notify the decoding unit 220 not to decode the data read from the memory unit 210. The data processing apparatus 201 will replace the data contained in the defective ECC block with the decoded data of the spare block according to a defect management scheme. The decoded results are transmitted to the host computer 202 via the host interface unit 226, and a decoding complete signal is transmitted to the microprocessor unit 208.

Similarly, the entries in the secondary defect list are stored according to an increasing order of IDs of the first sectors in defective ECC blocks. Therefore, utilizing the second ID counter 234 to count IDs of the first sectors in the ECC blocks can produce an increasing counting result. In this way, the SDL entries that store ID numbers less than the current counting result are not read again for comparison since have been checked. In other words, the SDL entry storing an ID number equal to or greater than the counting result is retrieved for comparison, thereby simplifying the defective ECC block identification process.

The determination of whether the defective data has a spare block by checking the field of "Status of Linear Replacement" in the secondary defect list is a solution that will be familiar to those skilled in the art, and the decoding operation of the decoding unit 220 after receiving the control signal sent by the second checking unit 224 is substantially the same as the decoding operation of a typical decoding unit. Therefore, the detailed descriptions of the decoding of the spare block and the replacing of the defective ECC block, etc. are omitted here for brevity. By utilizing the second checking module 224, the data stored in the memory unit 210 can be checked instantaneously, and the operation of the decoding unit 220 is much simpler since it needs to operate according to the signal sent by the second checking unit 224 without checking the data stored in the memory unit 210.

Moreover, the memory unit 210 in this embodiment is not limited to be a single memory such as a DRAM or SRAM, which means it can includes a plurality of individual memories where one memory is for storing the primary defect list and the secondary defect list, another memory is for storing the data outputted from the data buffering unit 216, and yet another memory is for storing the decoded result of the decoding unit 220 to be transmitted to the host computer 202.

In the above embodiment, two individual checking modules 218 and 224 are utilized to separately check the primary defect list and the secondary defect list. The primary defect list is checked by a dedicated checking module each time a sector is stored, while the secondary defect list is checked by another dedicated checking module each time an ECC block is to be decoded. Namely, the defective information necessary for data storage and data decoding is checked separately. Therefore, the defective information storing process and the data reproducing process can be simplified, and the efficiency of the microprocessor unit 208 can be improved.

Figure 3:
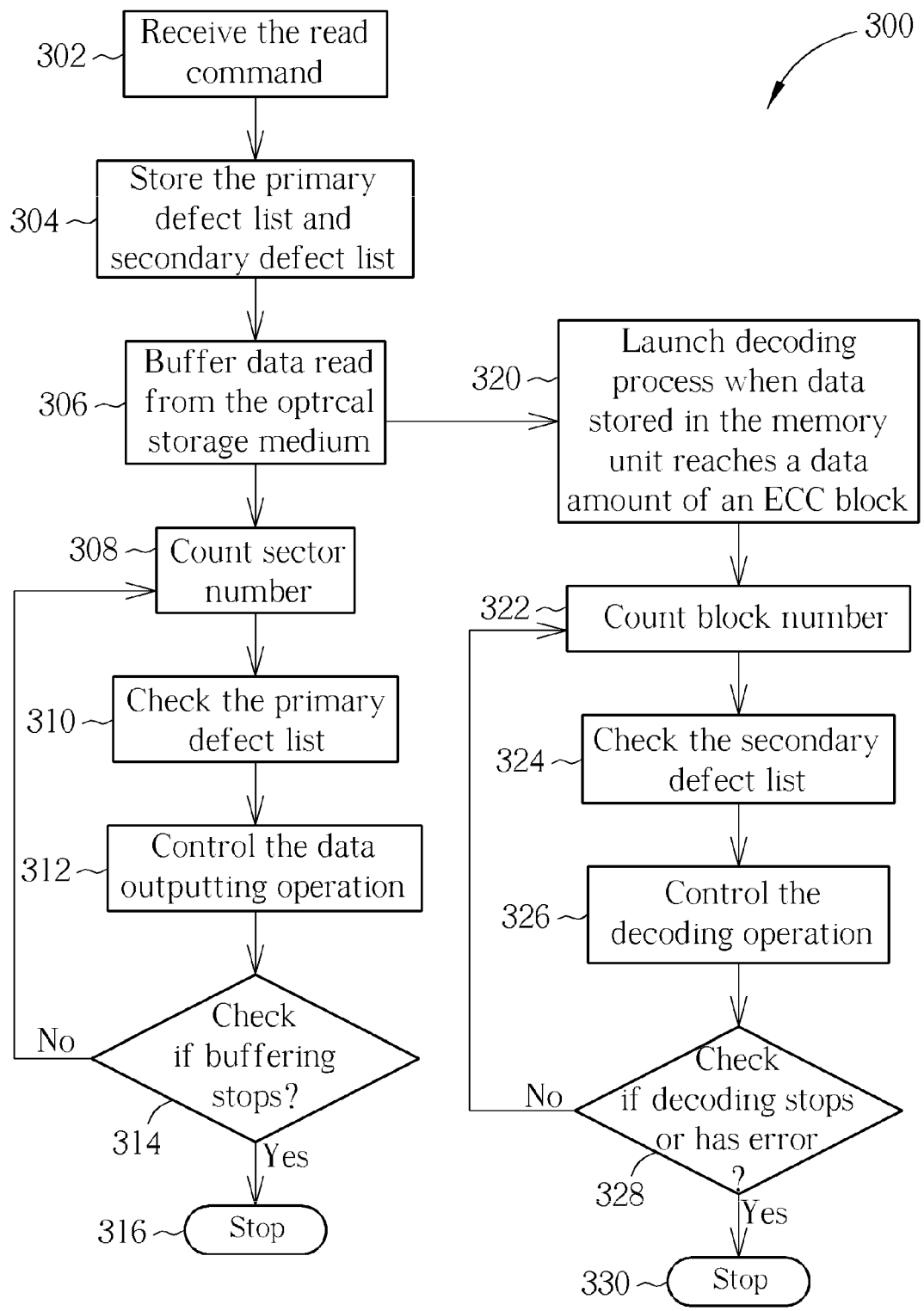
FIG. 3 is a flow chart of a data processing method according to an exemplary embodiment of the invention.

FIG. 3 is a flow chart of a data processing method according to an exemplary embodiment of the invention. Please note that under the condition that substantially the same result is achieved, the steps of the process 300 need not be in the exact order shown and need not be contiguous; that is, other steps can be intermediate.

In step 302, a read command including the logical block address and the transfer length is received from the host computer 202. The data reproducing device 200 further translates the logical block address into physical ID for the following checking process, and the primary defect list and the secondary primary defect list use physical ID to record defect area on the optical storage medium 206. The servo unit 214 then controls the optical pick up unit 204 to read data, the primary defect list and the secondary defect list from the optical storage medium 206. The primary defect list and the secondary defect list are then stored into the memory unit 210 in step 304.

The data read from the optical storage medium 206 is temporarily buffered in the data buffering unit 216, and the data reproducing device 200 determines whether the buffered data should be stored into the memory unit 210 (step 306). The sector number of the buffered data is counted in step 308, and is then compared with the primary defect list in step 310. Next, in step 312, the first checking module 218 controls the data outputting operation of the data buffering unit 216 according to the comparison results of step 310.

Step 314 checks if the data buffering is requested to stop. For example, when the data buffering unit 216 is full or a stop command is received from the host computer 202, the microprocessor unit 208 may stop the data buffering. If the checking result of step 314 is yes, the process 300 goes to step 316 and stops the data buffering; otherwise, the process 300 returns to step 308 in order to wait the complete signal and progress sector counting.

The microprocessor unit 208 monitors the buffering status, and launches the decoding process every time the data stored in the memory unit 210 reaches a data amount of an ECC block (step 320). The block number is counted in step 322, and the counting result is compared with the secondary defect list in step 324. In step 326, the second checking module 224 controls the decoding operation according to the comparison result of step 324. Then, step 328 checks if the decoding process is requested to stop or if an error occurs. The process 300 goes to step 330 that stops data buffering if step 328 determines that the decoding is stopped or the error occurs. Otherwise, the process 300 returns to step 322 in order to wait the decoding launch command and continue the block counting.

As mentioned above, individual checking modules are utilized to check the defect information for data storage and decoding respectively. The operations of the data buffering unit 216 and the decoding unit 220 are therefore much simpler since they need to operate according to the signals sent by the first checking module 218 and the second checking unit 224 respectively. The efficiency and performance of the data reproducing are thereby increased. Moreover, these configurations are merely given as examples of the present invention, and it will be readily appreciated by those skilled in the art that other configurations are possible, while still maintaining the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing apparatus for an optical storage medium, comprising:
   a memory unit arranged to store a primary defect list and a secondary defect list loaded from the optical storage medium, wherein the primary defect list and the secondary defect list indicate defect identifications (IDs) in the optical storage medium;
   a data buffering unit arranged to buffer data read from the optical storage medium and to output the data to the memory unit;
   a first checking module arranged to control a data outputting operation of the data buffering unit according to the data buffered in the data buffering unit and the primary defect list;
   a decoding unit arranged to decode data read from the memory unit; and
   a second checking module arranged to control a decoding operation of the decoding unit according to the data stored in the memory unit and the secondary defect list.

2. The apparatus of claim 1, wherein the first checking module comprises:
   a first ID counter arranged to count IDs of the data read from the optical storage medium; and
   a first ID checking unit arranged to check whether an ID of a specific data buffered in the data buffering unit is in the primary defect list according to a counting result of the first ID counter to generate a detection result, and to control the data outputting operation of the data buffering unit according to the detection result.

3. The apparatus of claim 2, wherein the optical storage medium is a DVD-RAM disc, and the first ID counter counts an ID per sector.

4. The apparatus of claim 1, wherein the second checking module comprises:
   a second ID counter arranged to count IDs of the data read from the memory unit; and
   a second ID checking unit arranged to check whether an ID of a specific data read from the memory unit is in the secondary defect list according to the counting result of the second ID counter to generate a detection result, and to control the decoding operation of the decoding unit according to the detection result.

5. The apparatus of claim 4, wherein the optical storage medium is a DVD-RAM disc, and the second ID counter counts an ID per block.

6. A data processing method for an optical storage medium, comprising:
   storing a primary defect list and a secondary defect list loaded from an optical storage medium, wherein the primary defect list and the secondary defect list indicate defect identifications (IDs) in the optical storage medium;
   buffering data read from the optical storage medium into a data buffering unit;
   controlling a data outputting operation from the data buffering unit to a memory unit by a first checking module according to the data buffered in the data buffering unit and the primary defect list;
   decoding data read from the memory unit; and
   controlling a decoding operation by a second checking module according to the data stored in the memory unit and the secondary defect list.

7. The method of claim 6, wherein controlling the data outputting operation from the data buffering unit to the memory unit by the first checking module comprises:
   utilizing the first checking module for counting IDs of the data read from the optical storage medium to generate a counting result, checking whether an ID of a specific data buffered in the data buffering unit is in the primary defect list according to the counting result to generate a detection result, and controlling the data outputting operation from the data buffering unit to the memory unit according to the detection result.

8. The method of claim 7, wherein the optical storage medium is a DVD-RAM disc, and the first checking module counts an ID per sector.

9. The method of claim 6, wherein controlling a decoding operation by a second checking module comprises:
   utilizing the second checking module for counting IDs of the data read from the memory unit to generate a counting result, checking whether an ID of a specific data read from the memory unit is in the secondary defect list according to the counting result to generate a detection result, and controlling the decoding operation according to the detection result.

10. The method of claim 9, wherein the optical storage medium is a DVD-RAM disc, and the second ID counter counts an ID per block.

* * * * *